US008509603B2

(12) United States Patent
Watanabe

(10) Patent No.: US 8,509,603 B2
(45) Date of Patent: Aug. 13, 2013

(54) INFORMATION PROCESSING METHOD AND INFORMATION PROCESSING APPARATUS

(75) Inventor: Ikuo Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 12/553,960

(22) Filed: Sep. 3, 2009

(65) Prior Publication Data

US 2009/0324204 A1    Dec. 31, 2009

Related U.S. Application Data

(62) Division of application No. 10/856,790, filed on Jun. 1, 2004, now Pat. No. 7,603,026.

(30) Foreign Application Priority Data

Jun. 10, 2003    (JP) .................................. 2003-165031

(51) Int. Cl.

| H04N 5/92 | (2006.01) |
|---|---|
| H04N 5/76 | (2006.01) |
| H04N 5/84 | (2006.01) |
| H04N 5/783 | (2006.01) |
| H04N 5/917 | (2006.01) |
| H04N 7/173 | (2011.01) |
| G06F 3/00 | (2006.01) |
| G06F 7/00 | (2006.01) |
| G06F 13/00 | (2006.01) |
| G11B 5/02 | (2006.01) |
| G11B 5/09 | (2006.01) |
| G11B 7/00 | (2006.01) |

(52) U.S. Cl.
USPC ........... 386/338; 386/328; 386/334; 386/345; 348/231.2; 348/231.3; 360/48; 360/57; 369/47.13; 369/47.15; 369/53.11; 369/53.24; 369/59.25; 707/705; 710/56; 711/144; 711/156; 711/203; 711/209; 725/90; 725/95; 725/102

(58) Field of Classification Search
USPC .................. 386/96, 101, 105, 106, 109, 111, 386/E5.013, E5.064, E9.038, E9.045; 348/231.2, 231.3; 360/48, 57; 369/13.2, 369/13.11, 30.07, 47.13, 47.15, 53.11, 53.24, 369/59.25, 126, 275.3; 375/E7.004, E7.016, 375/E7.129; 707/E17.034, 205; 725/90, 725/95, 102; 710/56; 711/144, 156, 203, 711/209, E12.068
See application file for complete search history.

(56) References Cited

U.S. PATENT DOCUMENTS

| 4,733,385 | A | * | 3/1988 | Henmi et al. ............... 369/13.11 |
|---|---|---|---|---|
| 5,164,841 | A | * | 11/1992 | Takahashi ..................... 386/101 |
| 5,341,361 | A | * | 8/1994 | Hosaka ........................ 369/275.3 |
| 5,561,778 | A | * | 10/1996 | Fecteau et al. ................. 711/209 |
| 5,659,539 | A | * | 8/1997 | Porter et al. ................... 709/231 |
| 6,219,311 | B1 | * | 4/2001 | Mitsuno ...................... 369/30.23 |
| 6,515,950 | B1 | * | 2/2003 | Tanikawa et al. ........... 369/53.24 |
| 6,539,169 | B1 | * | 3/2003 | Tsubaki et al. ............... 386/109 |
| 2002/0127001 | A1 | | 9/2002 | Gunji et al. |
| 2002/0149682 | A1 | | 10/2002 | Kudo |
| 2003/0026186 | A1 | * | 2/2003 | Ando et al. ................. 369/53.24 |
| 2004/0264327 | A1 | | 12/2004 | Gotoh et al. |

FOREIGN PATENT DOCUMENTS

| JP | 2001 043622 A | 2/2001 |
|---|---|---|
| JP | 2002 152666 A | 5/2002 |
| JP | 2002 314916 A | 10/2002 |
| JP | 2003 022653 | 1/2003 |
| WO | 03 019555 A1 | 3/2003 |

OTHER PUBLICATIONS

Japanese Office Action dated Oct. 29, 2007 (with Translation).

* cited by examiner

*Primary Examiner* — Thai Tran
*Assistant Examiner* — Syed Hasan
(74) *Attorney, Agent, or Firm* — Fitzpatrick, Cella, Harper & Scinto

(57) ABSTRACT

This invention provides an information processing method and apparatus, which can set all extent sizes of data divisionally recorded on a disk to be equal to or larger than the minimum recording unit, and can guarantee continuous reproduction of the divisionally recorded data. Of data divisionally recorded on a recording medium (5), data which corresponds to an end portion of that data and cannot be recorded as a recording area equal to or larger than a minimum recording unit specified in the recording medium (5) due to the presence of a recording area (6) of another data, that has already been recorded on the recording medium (5), is re-recorded on a recording area equal to or larger than the minimum recording unit. At this time, new data is generated by combining data less than the minimum recording unit, and data recorded in another recording area, and the new data is re-recorded on a new recording area.

9 Claims, 14 Drawing Sheets

FIG. 3

| SEEK TIME Tj | 1.0 sec | 1.0 sec | 1.0 sec |
|---|---|---|---|
| TRANSFER RATE St | 24 Mbps | 24 Mbps | 24 Mbps |
| MOVING IMAGE REPRODUCTION RATE Sv | 12 Mbps | 6 Mbps | 12 Mbps |
| DEFECTIVE BLOCK SIZE Dv | 0 Byte | 0 Byte | 300 KBytes |
| MOVING IMAGE MINIMUM RECORDING TIME Tv | 2.0 sec | 1.33 sec | 2.2 sec |
| MOVING IMAGE MINIMUM RECORDING SIZE Lv | 3.0 MB | 1.0 MB | 3.6 MB |

FIG. 13

| SEEK TIME Tj | 1.0 sec | 1.0 sec | 1.0 sec |
|---|---|---|---|
| TRANSFER RATE St | 24 Mbps | 24 Mbps | 24 Mbps |
| MOVING IMAGE REPRODUCTION RATE Sv | 12 Mbps | 6 Mbps | 12 Mbps |
| AUDIO REPRODUCTION RATE Sa | 256 Kbps | 256 Kbps | 256 Kbps |
| MOVING IMAGE DEFECTIVE BLOCK SIZE Dv | 0 Byte | 0 Byte | 920 KBytes |
| AUDIO DEFECTIVE BLOCK SIZE Da | 0 Byte | 0 Byte | 20 KBytes |
| MOVING IMAGE MINIMUM RECORDING TIME Tv | 6.13 sec | 4.06 sec | 6.75 sec |
| AUDIO MINIMUM RECORDING TIME Ta | 6.13 sec | 4.06 sec | 6.75 sec |
| MOVING IMAGE MINIMUM RECORDING SIZE Lv | 9.19 MB | 3.04 MB | 11.0 MB |
| AUDIO MINIMUM RECORDING SIZE La | 196 KB | 130 KB | 236 KB |

FIG. 14

| SEEK TIME Tj | 1.0 sec | 1.0 sec | 1.0 sec |
|---|---|---|---|
| TRANSFER RATE St | 24 Mbps | 24 Mbps | 24 Mbps |
| MOVING IMAGE REPRODUCTION RATE Sv | 12 Mbps | 6 Mbps | 12 Mbps |
| AUDIO REPRODUCTION RATE Sa | 256 Kbps | 256 Kbps | 256 Kbps |
| MOVING IMAGE DEFECTIVE BLOCK SIZE Dv | 0 Byte | 0 Byte | 920 KBytes |
| AUDIO DEFECTIVE BLOCK SIZE Da | 0 Byte | 0 Byte | 20 KBytes |
| MOVING IMAGE MINIMUM RECORDING TIME Tv | 4.09 sec | 2.70 sec | 4.73 sec |
| AUDIO MINIMUM RECORDING TIME Ta | 4.09 sec | 2.70 sec | 4.73 sec |
| MOVING IMAGE MINIMUM RECORDING SIZE Lv | 6.13 MB | 2.03 MB | 8.01 MB |
| AUDIO MINIMUM RECORDING SIZE La | 131 KB | 86.5 KB | 171 KB |

INFORMATION PROCESSING METHOD AND INFORMATION PROCESSING APPARATUS

This application is a divisional of U.S. patent application Ser. No. 10/856,790, filed Jun. 1, 2004, the contents of which are incorporated by reference herein.

FIELD OF THE INVENTION

The present invention relates to an information processing technique for recording and reproducing moving image data or the like on and from a disk-shaped recording medium.

BACKGROUND OF THE INVENTION

In recent years, camera integrated type recording/reproduction apparatuses (to be referred to as "video cameras" hereinafter) which adopt disk-shaped recording media (to be referred to as "disks" hereinafter) such as a DVD and the like as recording media for recording various data are commercially available. In such video camera, data input/output processes characterized by random access to recording media unlike in magnetic tapes are made.

For example, the video camera can record moving image data, still image data, or audio data associated with captured scenes as files at arbitrary locations of a disk. Also, the video camera can execute an easy, high-speed reproduction process of recorded data by directly accessing respective files in a reproduction mode (e.g., see Japanese Patent Laid-Open No. 2002-314916).

In general, when files of moving image data, audio data, and the like are to be recorded on a disk, these data are divided into a plurality of groups of continuously recorded data, and these groups of data are recorded on separated areas on the disk. An area on the disk where the group of data which forms a part of file and is recorded on a continuous area will be referred to as an "extent" hereinafter.

Upon reproducing moving image data and audio data which are divisionally recorded on a plurality of extents, a head used to reproduce data requires a certain period of time (seek time) when it moves between the extents. When the extent size is small, data to be reproduced cannot be supplied in time, and continuous reproduction is often disturbed. For this reason, in a DVD as one of disks adopted in the video camera, a minimum recording unit that satisfies a length required for a continuous reproduction process of moving image data and audio data is specified as a standard. In general, such minimum recording unit that guarantees continuous reproduction is called a CDA (Continuous Data Area).

However, when a continuous free area is discontinued upon recording moving image data on the disk, and an extent after seek has a size smaller than the minimum recording unit, continuous reproduction may be disturbed due to the presence of such extent upon making continuous reproduction with another moving image data.

SUMMARY OF THE INVENTION

The present invention has been proposed to solve the conventional problems, and has as its objects to provide an information processing method and information processing apparatus, which can set all extent sizes of data divisionally recorded on a disk to be equal to or larger than the minimum recording unit, and can guarantee continuous reproduction of the divisionally recorded data.

In order to achieve the above object, according to the present invention, there is provided an information processing method for recording data on a recording medium, comprising:

a re-recording step of re-recording predetermined data of the data, which is divisionally recorded on different recording areas, onto a new recording area which has a size not less than a minimum recording unit specified in the recording medium.

Furthermore, in order to achieve the above object, according to the present invention, there is provided the method, wherein the re-recording step includes a step of generating new data, which has a size not less than the minimum recording unit, by combining the predetermined data and data immediately before the predetermined data, which is recorded on another recording area, and re-recording the new data on the new recording area.

Furthermore, in order to achieve the above object, according to the present invention, there is provided an information processing apparatus for recording data on a recording medium, comprising:

re-recording means for re-recording predetermined data of the data, which is divisionally recorded on different recording areas, onto a new recording area which has a size not less than a minimum recording unit specified in the recording medium.

Furthermore, in order to achieve the above object, according to the present invention, there is provided the apparatus, wherein the re-recording means comprises means for generating new data, which has a size not less than the minimum recording unit, by combining the predetermined data and data immediately before the predetermined data, which is recorded on another recording area, and means for re-recording the new data on the new recording area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of CDA calculations in the moving image sole reproduction mode;

FIG. 13 is a table showing an example of CDA calculations in a general after-recording reproduction mode; and FIG. 14 is a table showing an example of CDA calculations in the after-recording reproduction mode according to the third embodiment.

DETAILED DESCRIPTION OF THE PREFERRED EMBODIMENTS

Preferred embodiments of the present invention will be described hereinafter with reference to the accompanying drawings.

First Embodiment

[Arrangement of Information Processing Apparatus]

Figure 1:
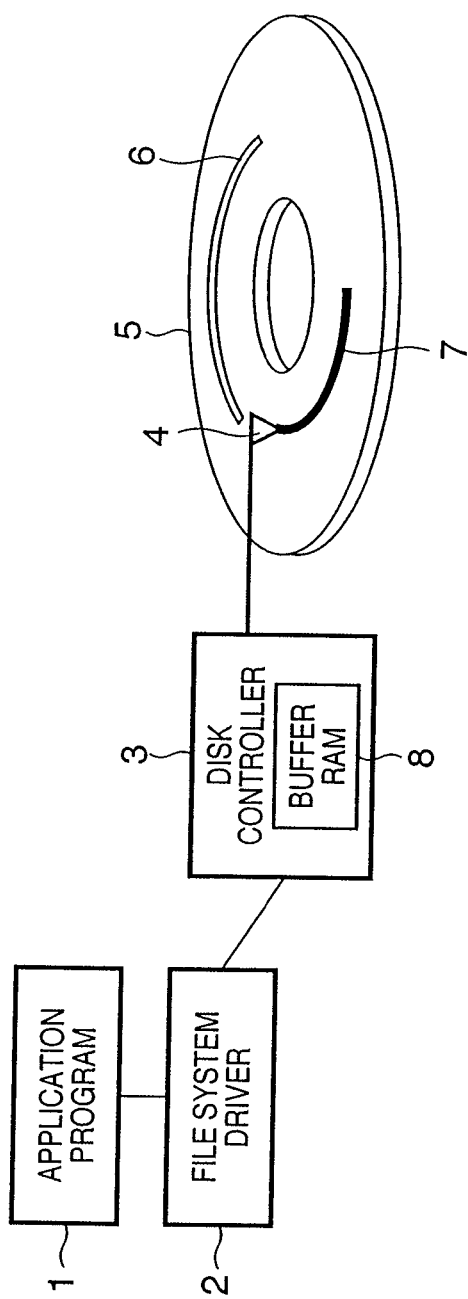
FIG. 1 is a schematic diagram showing the arrangement of an information processing apparatus according to the first embodiment of the present invention.

FIG. 1 is a schematic diagram showing the arrangement of an information processing apparatus according to the first embodiment of the present invention. Referring to FIG. 1, reference numeral 1 denotes an application program, which instructs a file system driver 2 to execute recording, reproduction, edit, and the like of files on a disk 5. The file system driver 2 checks a free area and file recording location on the disk 5, and supplies a data read/write instruction of the disk 5 to a disk controller 3. At that time, the application program 1 can issue an instruction regardless of the location of data on the disk 5, and the file system driver 2 reads out data by searching for a free area on the disk 5 or a location of data on the disk 5.

The disk controller 3 actually writes data on the disk 5, and reads out recorded data from the disk 5. A recording/reproduction head 4 reads/writes data from/on the disk 5. Note that the disk controller 3 comprises a buffer RAM 8 used to temporarily store data upon read/write access to the disk 5.

Reference numeral 6 denotes actual data (existing write data) which has already been written on the disk 5; and 7, actual data (new write data) which is newly written on the disk 5. In this embodiment, a single file is divided into partial data which are recorded on different areas on the disk 5, and a plurality of recording areas are present. However, in practice, a single file is continuously recorded on a single recording area in some cases.

[CDA in Moving Image Sole Reproduction Mode]

Figure 2:
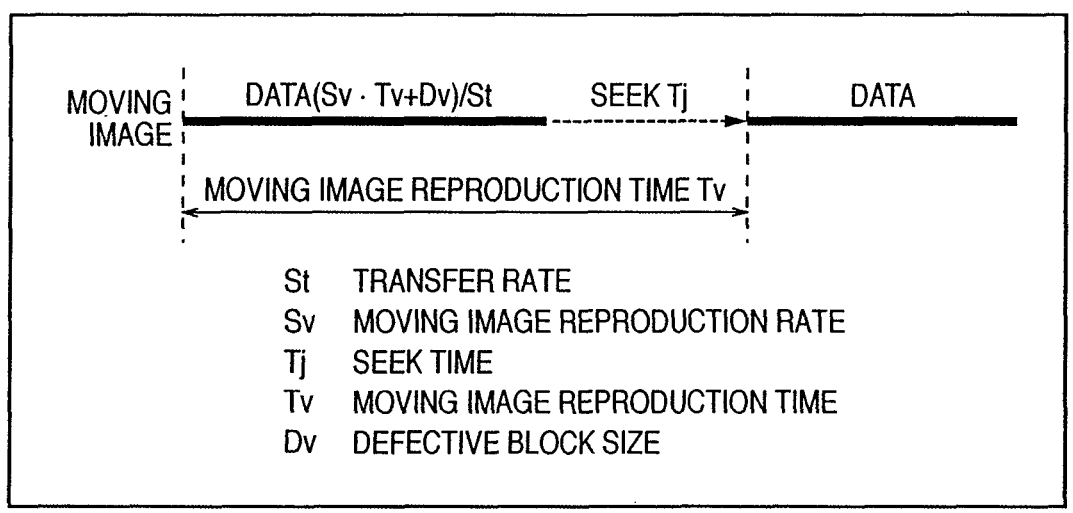
FIG. 2 is a view for explaining the relationship between the recorded data and reproduction time in a moving image sole reproduction mode by the information processing apparatus according to the first embodiment.

FIG. 2 is a view for explaining the relationship between the recorded data and reproduction time in a moving image sole reproduction mode by the information processing apparatus according to the first embodiment. In FIG. 2, the bold line indicates a time required for the recording/reproduction head 4 to move over an area (extent) on the disk 5 where data is recorded, and the broken line indicates a time (seek time) required for the recording/reproduction head 4 to seek. Also, in FIG. 2, the thin line indicates a time required to reproduce data read out by the recording/reproduction head 4.

As shown in FIG. 2, data is normally divided into a plurality of partial data, which are divisionally recorded on respective recording areas (called extents) on the disk 5. When data is continuously recorded on different extents, the seek time of the recording/reproduction head 4 is generated between these extents. For this reason, when the sum of the read time of data recorded in an arbitrary extent and the seek time to the next extent is smaller than the data reproduction time in that extent, continuous reproduction of data is disturbed. Hence, as described above, it is a common practice to record data on a free area which is equal to or larger than a minimum recording area (CDA) that allows continuous reproduction of data without disconnection.

The method of calculating the CDA in the moving image sole reproduction mode will be described below using FIG. 2. The bold line portion in FIG. 2 indicates the time required to read data included in one extent, and moving image data for a reproduction time Tv (sec) is included. The moving image data for the reproduction time Tv has a size of Sv×Tv (bits) (Sv (bps) is the moving image reproduction rate). Since the extent often includes a defective block, the extent size is Sv×Tv+Dv (bits) (Dv (bits) is the defective block size).

That is, when the transfer rate upon reading out data from the disk is St (bps), the time required to read data in the extent from the disk is given by (Sv×Tv+Dv)/St (sec). If a time required until the recording/reproduction head 4 reaches the next extent is Tj (sec), the data read process and head seek process must be completed within the reproduction time Tv (sec) of the moving image data included in one extent. That is, the following inequality need only be satisfied:

$$Tv \geq Tj + \frac{Sv \times Tv + Dv}{St} \tag{1}$$

From the above inequality, we have:

$$\left(1 - \frac{Sv}{St}\right)Tv \geq Tj + \frac{Dv}{St} \tag{2}$$

Hence, the CDA is defined by:

$$Tv \geq \frac{Tj + Dv/St}{1 - Sv/St} \tag{3}$$

$$Lv \geq Sv \times Tv + Dv$$

where Tv is the minimum recording time (sec) of a moving image that guarantees continuous reproduction, and Lv is the minimum recording size (bits) of a moving image that guarantees continuous reproduction. In the above description, "sec" and "bits" are used as units of time and size, but other units may be used.

FIG. 3 shows an example of CDA calculations in the moving image sole reproduction mode. If the seek time Tj is 1.0 (sec), the transfer rate St is 24 M (bps), the moving image reproduction rate Sv is 12 M (bps), and the defective block size Dv is 0 bit, we have:

$Tv \geq 2.0$ sec $Lv \geq 3.0$ MB (4)

If no defective block is present, data can be recorded to have a minimum extent size of 3.0 M (B). Upon calculation while changing the condition, if the moving image reproduction rate Sv is 6 M (bps), we have:

$Tv \geq 1.33$ sec $Lv \geq 1.0$ MB (5)

As can be seen from these inequalities, when the moving image reproduction rate becomes ½, the minimum recording time becomes about ⅔, and the minimum recording size becomes about ⅓. Note that this change amount depends on the transfer rate St and moving image reproduction rate Sv. Furthermore, when the defective block size Dv is 30K (B), i.e., the defective block ratio is about 10% of the minimum recording size, we have:

$Tv \geq 2.2$ sec $Lv \geq 3.6$ MB (6)

As can be seen from these inequalities, when the defective block ratio increases 10%, the minimum recording time increases about 10%, and the minimum recording size increases about 20%.

[Actual Data Recording Size]

In an actual apparatus, the maximum seek time Tj and transfer rate St are constant. Hence, upon actually recording data, the CDA size is determined based on the reproduction rates of moving image data and audio data, and the defective block size. Normally, the CDA size is determined in advance in consideration of the worst case irrespective of the reproduction rate and defective block size. Note that the audio reproduction rate is normally constant, and a change in audio reproduction rate is sufficiently smaller than that in moving image reproduction rate even if it takes place. Hence, the influence of the change in audio reproduction rate on a change in CDA can be ignored.

Embodiment

Figure 4:
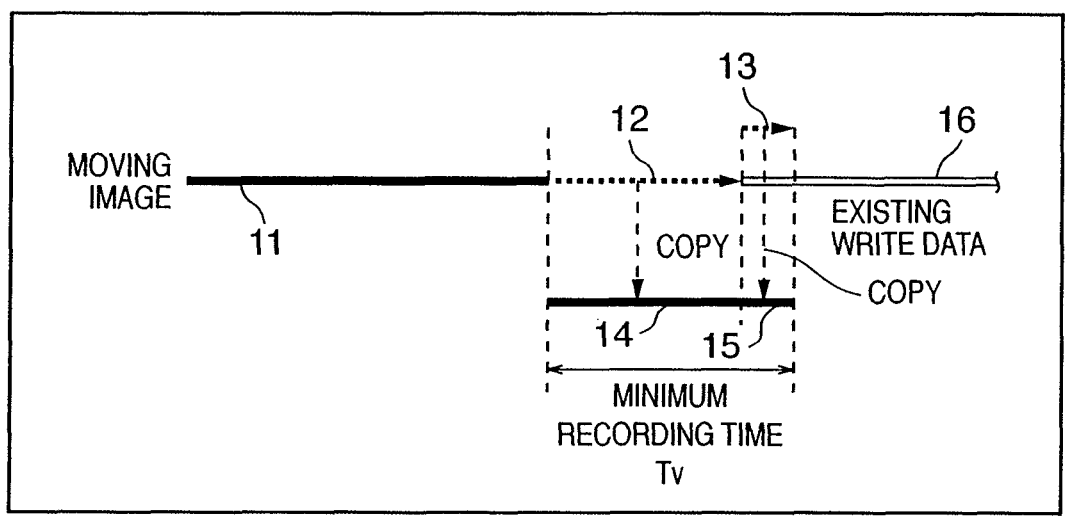
FIG. 4 is a view for explaining a sequence for recording moving image data on a disk using the information processing apparatus according to the first embodiment of the present invention.
Figure 5:
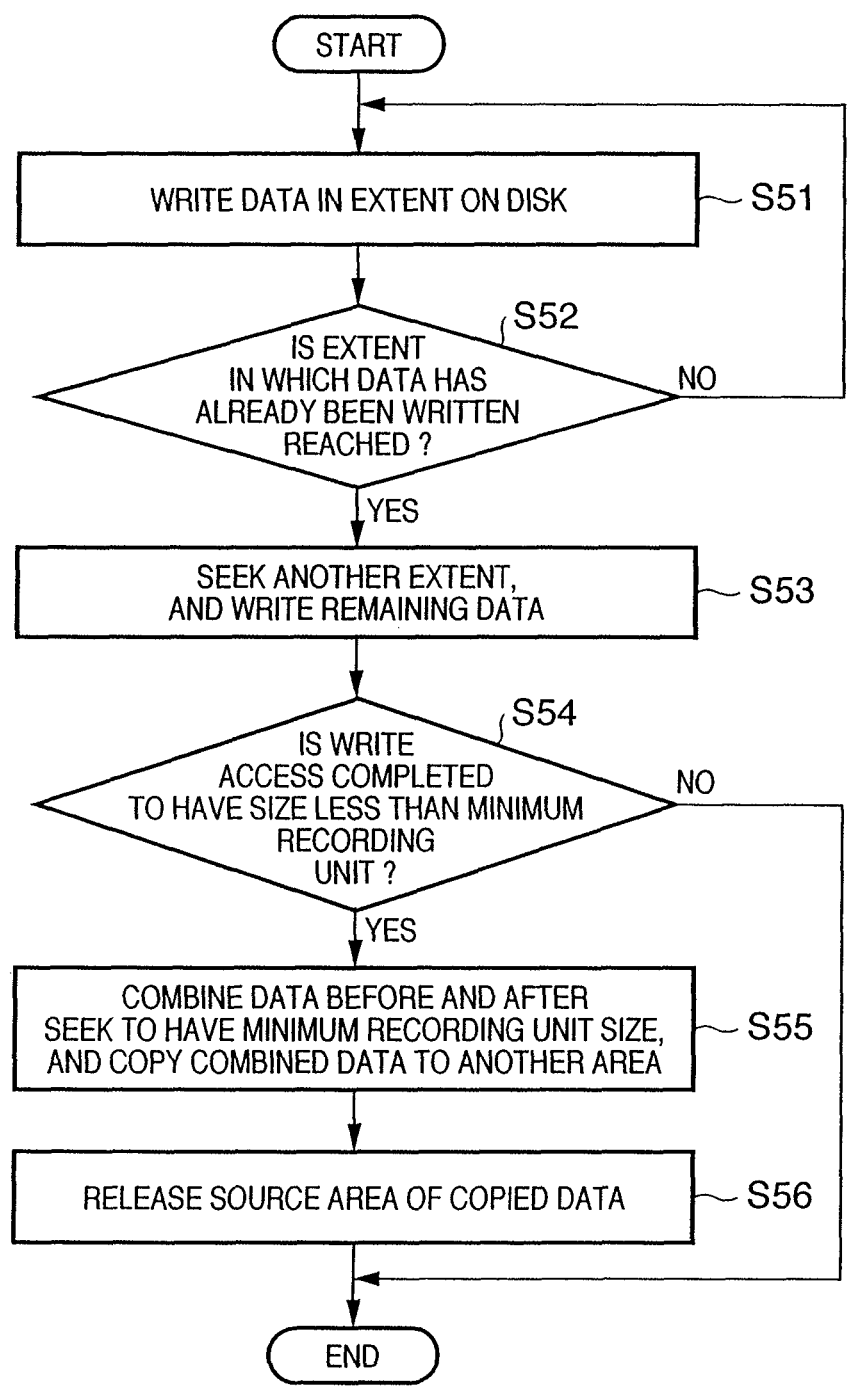
FIG. 5 is a flowchart for explaining a moving image data recording sequence on the disk by the information processing apparatus according to the first embodiment of the present invention.

FIG. 4 is a view for explaining a sequence for recording moving image data on a disk using the information processing apparatus according to the first embodiment of the present invention. FIG. 5 is a flowchart for explaining a moving image data recording sequence by the information processing apparatus according to the first embodiment.

Data is written in an extent 11 on the disk 5 via the buffer RAM 8 (step S51). When data is continuously written in the extent 11 (a portion denoted by reference numeral 12) via the buffer RAM 8, since the file system driver 2 reaches an extent 16 including existing write data (YES in step S52), it seeks another extent 13 on the disk 5, and writes the remaining data on that extent (step S53). Assume that the remaining data written in the extent 13 comes to an end to be shorter than the minimum recording time. As described above, the presence of an extent smaller than the minimum recording unit disturbs continuous reproduction of the data.

If the application program 1 acquires information indicating that the write access is completed to be smaller than the minimum recording unit after seek from the file system driver 2 after data is recorded on the disk 5 (YES in step S54), it generates data for at least the minimum recording unit by combining data of the extent 13 after seek and the data 12 of the extent 11 before seek, and copies that data to another area on the disk 5 (step S55). Then, the copy source areas (extents 12 and 13) are released to be able to be used in the next write access (step S56).

In the description of this embodiment, the areas of the disk 5 before and after seek are read again and copied. However, in practice, data immediately after the write access normally remains stored in the buffer RAM 8 in the disk controller 3. In this case, when the corresponding contents of the buffer RAM 8 are written in the disk 5 again, data need not be sought and read out again. Each extent that records partial data other than the last part is normally recorded to have a size equal to or larger than the minimum recording unit. Even when extents other than the final part include an extent having a size smaller than the minimum recording unit, it can be processed by the same sequence as described above, so that all extends can have a size equal to or larger than the minimum recording unit.

Application Example

Figure 6:
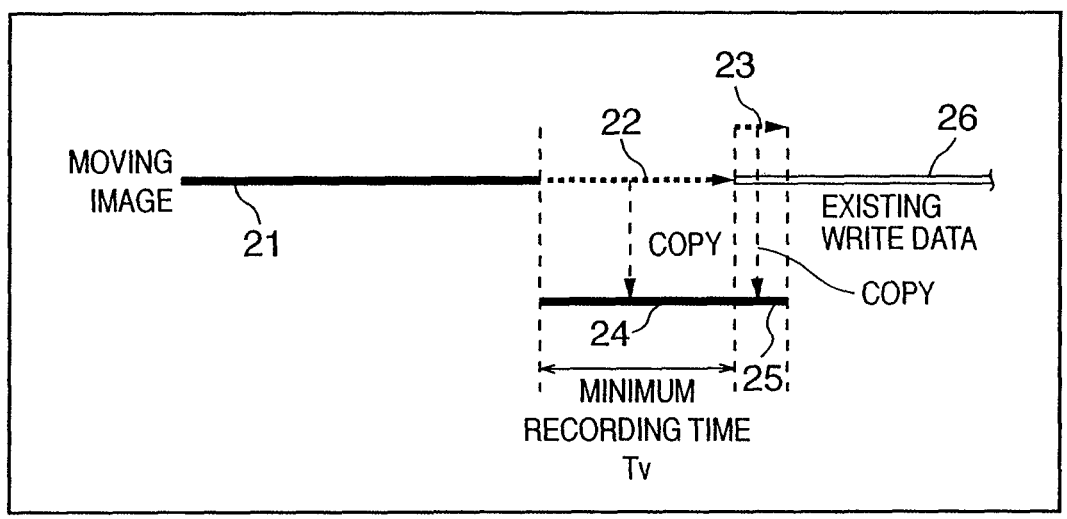
FIG. 6 is a view for explaining another sequence for recording moving image data on a disk using the information processing apparatus according to the first embodiment of the present invention.
Figure 7:
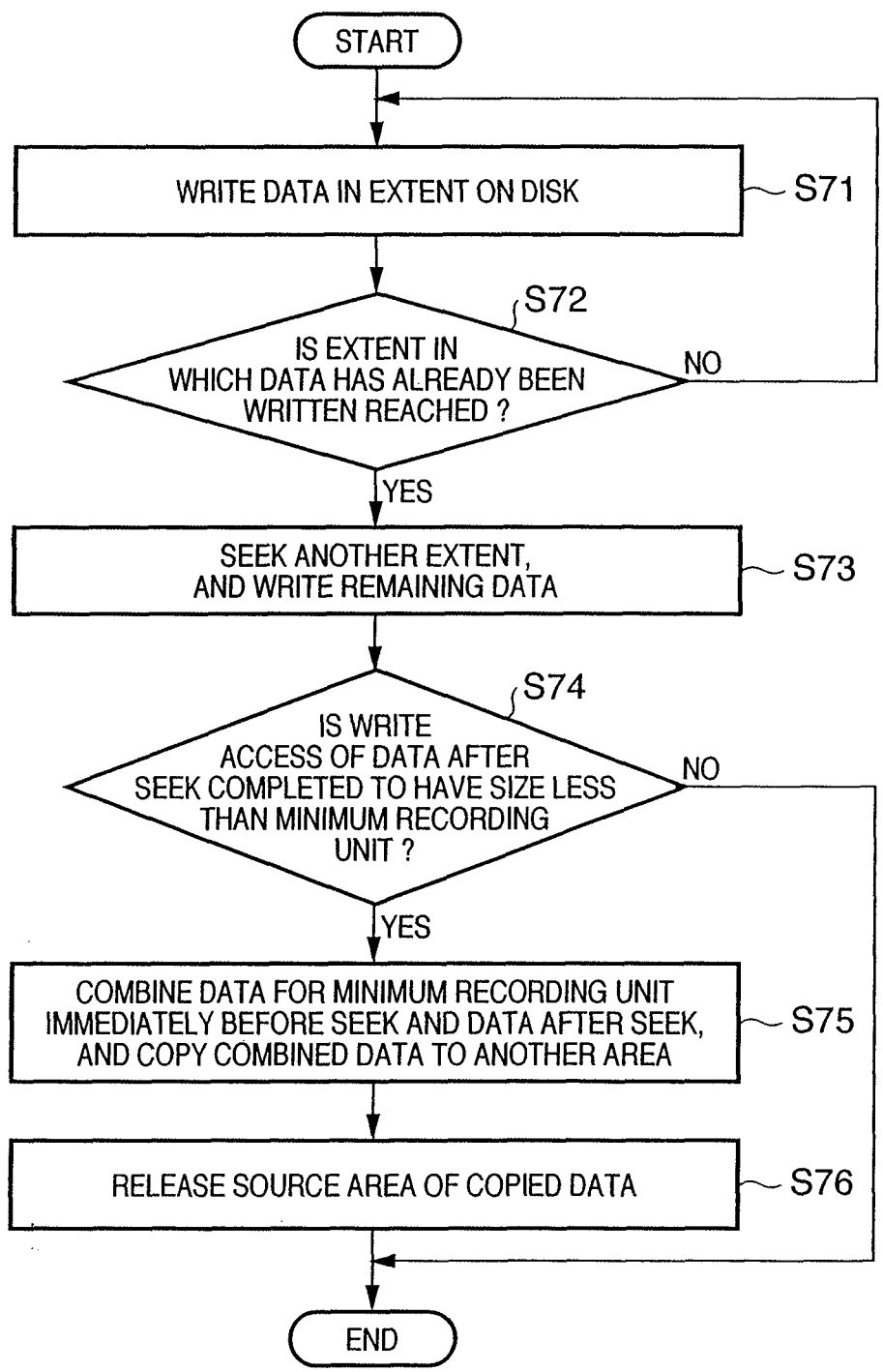
FIG. 7 is a flowchart for explaining another moving image data recording sequence on the disk by the information processing apparatus according to the first embodiment of the present invention.

FIG. 6 is a view for explaining another sequence for recording moving image data on the disk using the information processing apparatus according to the first embodiment of the present invention. FIG. 7 is a flowchart for explaining another moving image data recording sequence by the information processing apparatus according to the first embodiment.

Data is written in an extent 21 on the disk 5 via the buffer RAM 8 (step S71). When data is continuously written in the extent 21 (a portion denoted by reference numeral 22) via the buffer RAM 8, since the file system driver 2 reaches an extent 26 including existing write data (YES in step S72), it seeks another extent 13 on the disk 5, and writes the remaining data on that extent (step S73). Assume that the remaining data written in the extent 13 comes to an end to be shorter than the minimum recording time.

If the application program 1 acquires information indicating that the write access is completed to be smaller than the minimum recording unit after seek from the file system driver 2 after data is recorded on the disk 5 (YES in step S74), it generates data (data including data 24 and 25) by combining data of the extent 23 after seek and the data 22 (for at least the minimum recording unit) of the extent 21 before seek, and copies that data to another area on the disk 5 (step S75). Then, the copy source areas (extents 22 and 23) are released to be able to be used in the next write access (step S76).

As described above, according to this embodiment, when moving image data or the like to be recorded on the disk 5 is recorded in an extent smaller than the minimum recording unit, temporarily recorded data is copied, so that all extends have a size equal to or larger than the minimum recording unit, thus guaranteeing continuous reproduction of data recorded on the disk 5. By deleting source data after copy, another data can be recorded on the released area. Furthermore, as described in the application example, since an area to be released after copy has a size equal to or larger than the minimum recording unit, another data can be recorded in the released area to have a size equal to or larger than the minimum recording unit, thus further improving the disk use efficiency.

Second Embodiment

The first embodiment solves the following problem: when the continuous free area is disconnected upon recording moving image data on the disk, and the write process ends before the recorded size after seek reaches the minimum recording unit, continuous reproduction is disturbed upon making continuous reproduction with another moving image data. The second embodiment will explain an information processing method and information processing apparatus, which solves the following problem: when the write process ends before the size of a continuous free area immediately after completion of moving image recording on the disk reaches the minimum recording unit, that area cannot be used as an area for recording another moving image data.

Note that the arrangement of the information processing apparatus, CDA in the moving image sole reproduction mode, and actual data recording size used in the second embodiment are the same as those of the information processing apparatus according to the first embodiment, and a detailed description thereof will be omitted.

Embodiment

Figure 8:
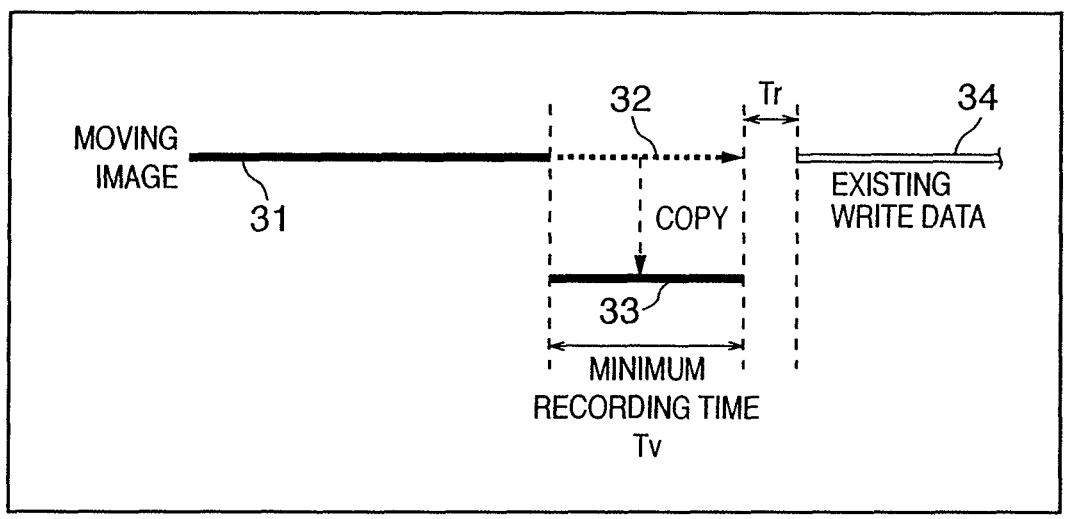
FIG. 8 is a view for explaining a sequence for recording moving image data using an information processing apparatus according to the second embodiment of the present invention.
Figure 9:
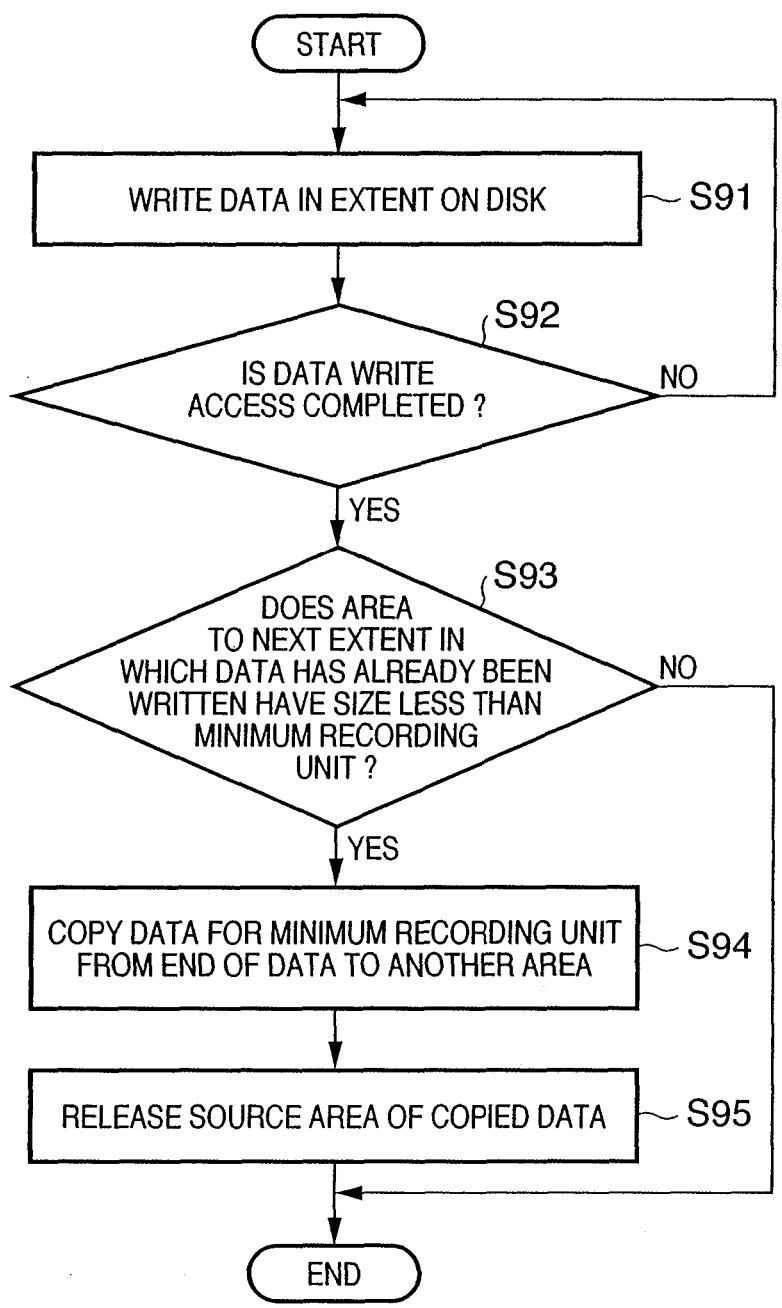
FIG. 9 is a flowchart for explaining a moving image data recording sequence on the disk by the information processing apparatus according to the second embodiment of the present invention.

FIG. 8 is a view for explaining a sequence for recording moving image data using the information processing apparatus according to the second embodiment of the present invention. FIG. 9 is a flowchart for explaining a moving image data recording sequence on the disk by the information processing apparatus according to the second embodiment of the present invention.

Data is written in an extent 31 on the disk 5 via the buffer RAM 8 (step S91). Data is continuously written in the extent 31 (a portion of data 32) via the buffer RAM 8, and it is checked if the write process is complete (step S92). The file system driver 2 checks if a portion Tr to an extent 34 as the next recording area of existing write area has a size smaller than the minimum recording unit (step S93). As a result, if Tr is smaller than the minimum recording unit (YES in step S93), the data 32 for at least the minimum recording time is copied from the end of data to another area (extent 33) (step S94). The data 32 as the copy source is released to be able to be used in the next write process (step S95). In this manner, the released free area can have a size equal to or larger than the minimum recording unit, and data recorded on this free area can be appropriately reproduced, thus preventing a wasteful area from being formed on the disk.

In the description of this embodiment, image data for the minimum recording time is read again and copied. However, in practice, the disk controller 3 comprises the buffer RAM 8, and data immediately after the write access normally remains stored in the buffer RAM 8. In this case, when the corresponding contents of the buffer RAM 8 are written again, data need not be sought and read out again.

As described above, according to this embodiment, when a continuous free area which follows an extent that records moving image data or the like to be recorded on the disk has a size smaller than the minimum recording unit, data is automatically copied, so that the continuous free area of interest has a size equal to or larger than the minimum recording unit. Hence, even when another data is recorded in that free area, continuous reproduction of moving image data can be guaranteed.

Third Embodiment

This embodiment will explain an information processing method and information processing apparatus, which can reduce the number of times of seek in an after-recording reproduction mode.

[CDA in General After-Recording Reproduction Mode]

The CDA in a general after-recording reproduction mode will be explained first. After recording is practiced by simultaneously reading files of moving image data and audio data which are recorded as independent files on a disk, and replacing audio data included in the moving image data by the after-recording audio data. The same applies to a case wherein an audio channel included in moving image data is mixed with that of another file upon output, in addition to after recording.

Figure 10:
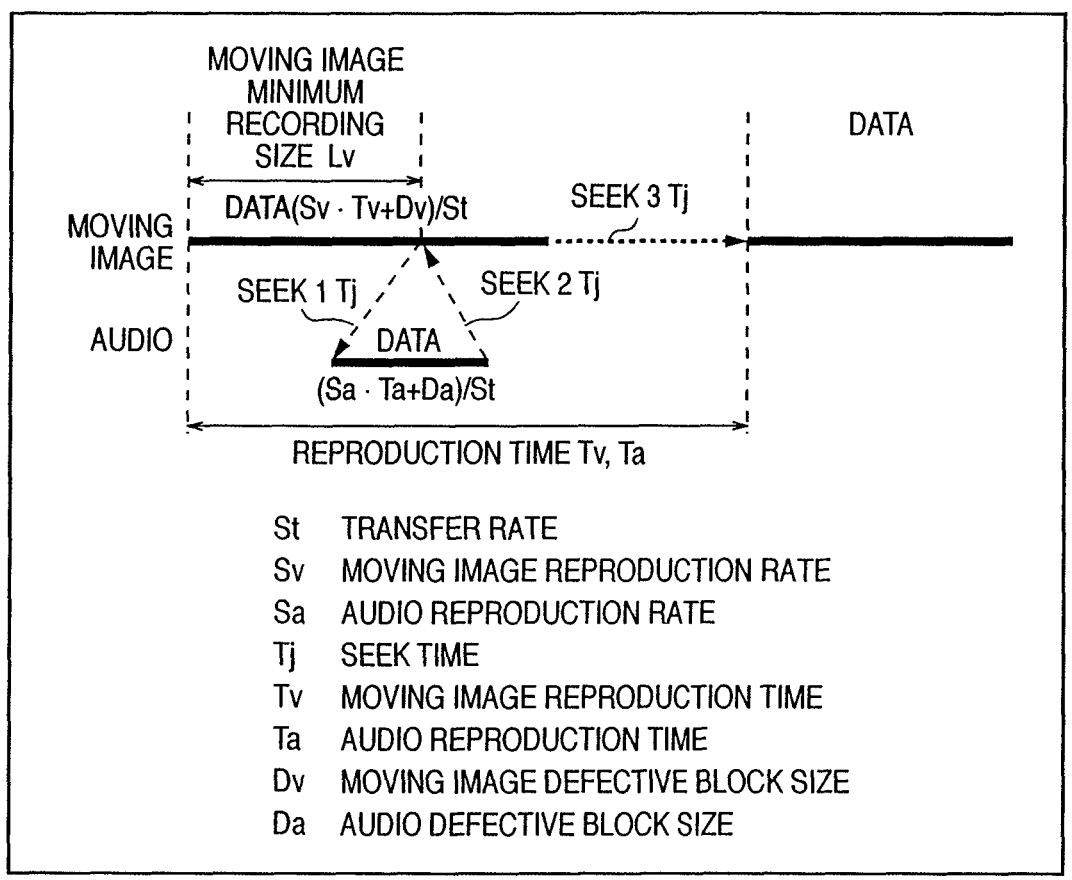
FIG. 10 is a view for explaining the relationship between the recorded data and reproduction time in a general after-recording reproduction mode by an information processing apparatus.

FIG. 10 is a view for explaining the relationship between the recorded data and reproduction time in a after-recording reproduction mode by a general information processing apparatus. Referring to FIG. 10, the bold line indicates a time required to move the recording/reproduction head to an area (extent) where data is recorded, and the broken line indicates a seek time required for the recording/reproduction head. As shown in FIG. 9, moving image data and audio data are divided into extends, which are divisionally recorded on a disk.

When continuous reproduction is made from different extents, the seek time of the head is generated between the extents (seek time 3). In case of after recording, a seek time is generated to read out audio data during the read process of the moving image data (seek times 1 and 2). For this reason, when the sum of the read times of data recorded in the extents of moving image data and audio data and the seek time to the next data is longer than the data reproduction time in the extents, continuous reproduction of after recording data is disturbed. Hence, the CDA (minimum recording area) must be specified even in the after-recording mode.

The method of calculating the CDA in the after-recording reproduction mode will be described below using FIG. 10. As described above, the bold line portion in FIG. 10 indicates the read times of moving image data and audio data included in one each extents, and moving image data for a reproduction time Tv (sec) and audio data for a reproduction time Ta (sec) are included. As in the moving image sole reproduction mode, let Sv (bps) be the moving image reproduction rate, Sa (bps) be the audio reproduction rate, Dv (bits) be the defective block size in a moving image extent, Da (bits) be the defective block size in an audio extent, and St (bps) be the transfer rate from the disk. Then, the read time of data in the moving image extent from the disk is given by (Sv×Tv+Dv)/St (sec), and that of data in the audio extent from the disk is given by (Sa×Ta+Da)/St (sec). Let Tj (sec) be the time (seek time) required for the head to move between extents. Then, in order to continuously make after-recording reproduction without any disconnection, the data read process and head seek process must be completed within the reproduction times Tv and Ta (sec) of the moving image data and audio data included in one each extents. Consequently, the following inequalities need only be satisfied:

$$Tv \geq 3 \times Tj + \frac{Sv \times Tv + Dv}{St} + \frac{Sa \times Ta + Da}{St} \qquad (7)$$

$$Ta \geq 3 \times Tj + \frac{Sa \times Ta + Da}{St} + \frac{Sv \times Tv + Dv}{St}$$

From the above inequalities, we have:

$$\left(1 - \frac{Sv}{St} - \frac{Sa}{St}\right)Tv \geq 3 \times Tj + \frac{Dv}{St} + \frac{Da}{St} \qquad (8)$$

-continued $$\left(1 - \frac{Sa}{St} - \frac{Sv}{St}\right)Ta \geq 3 \times Tj + \frac{Da}{St} + \frac{Dv}{St}$$

(minimum values of Tv and Ta are equal to each other), and the CDA is defined by:

$$Tv \geq \frac{3 \times Tj + Dv/St + Da/St}{1 - Sv/St - Sa/St} \quad (9)$$

$$Ta \geq \frac{3 \times Tj + Da/St + Dv/St}{1 - Sv/St - Sa/St}$$

$$Lv \geq Sv \times Tv + Dv$$

$$La \geq Sa \times Ta + Da$$

where Tv and Ta are the minimum recording times (sec) of moving image data and audio data that guarantee continuous reproduction, respectively. Also, Lv and La are the minimum recording sizes (bits) of moving image data and audio data that guarantee continuous reproduction, respectively. As can be seen from the above inequalities, the minimum values of Tv and Ta are equal to each other. In this embodiment as well, "sec" and "bits" are used as units of time and size, but the present invention is not limited to such specific units.

However, with the CDA in the general after-recording reproduction mode, the minimum recording unit is defined under the assumption that the number of streams is one, and when the minimum recording unit is changed later to make reproduction while switching a plurality of image and audio streams by the after-recording process or the like, the number of times of seek increases, and the effective data size included in the initial minimum recording unit decreases, thus disturbing continuous reproduction. When the minimum recording unit is defined in advance under the assumption of reproduction which is made while switching a plurality of streams, a large recording unit more than necessary is required.

Furthermore, as described above, the moving image minimum recording time Tv, audio minimum recording time Ta, moving image minimum recording size Lv, and audio minimum recording size La upon making after-recording reproduction using moving image data and audio data are influenced by three seek times Tj. Hence, the third embodiment will explain an information processing apparatus which comprises a mechanism for reducing the number of times of seek.

[Arrangement of Information Processing Apparatus]

Figure 11:
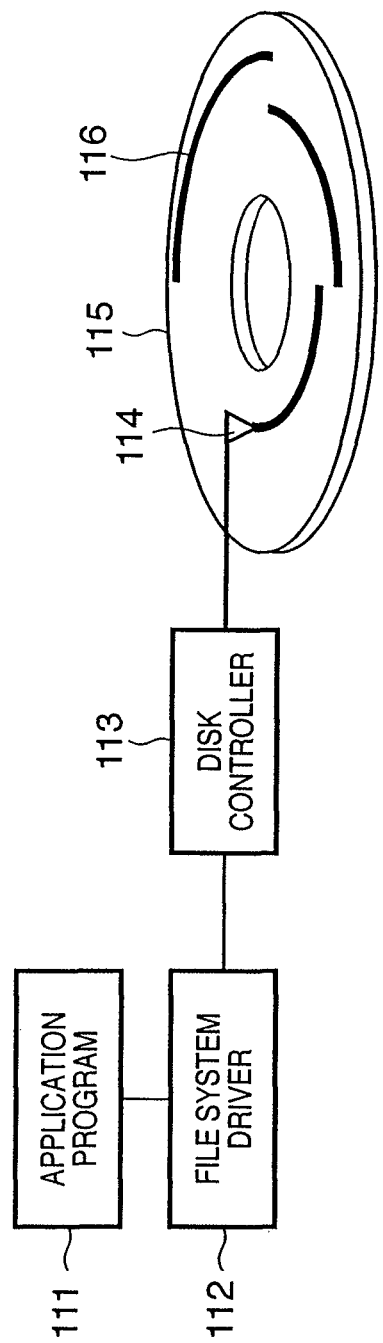
FIG. 11 is a schematic diagram showing the arrangement of an information processing apparatus according to the third embodiment of the present invention.

FIG. 11 is a schematic diagram showing the arrangement of an information recording/reproduction apparatus according to the third embodiment of the present invention. Referring to FIG. 11, reference numeral 111 denotes an application program, which instructs a file system driver 112 to execute recording, reproduction, edit, and the like of files on a disk 115. The file system driver 112 checks a free area and file recording location on the disk 115, and supplies a data read/write instruction of the disk 115 to a disk controller 113. At that time, the application program 111 can issue an instruction regardless of the location of data on the disk 115, and the file system driver 112 records data by searching for a free area on the disk 115 or reads out data by searching for a location of data on the disk.

The disk controller 113 actually writes data on the disk 115, and reads out recorded data from the disk. Note that the disk controller 113 comprises a buffer RAM used to temporarily store data upon read/write access to the disk 115.

Reference numeral 116 denotes data recording areas of actual moving image data, audio data, and the like which have already been written on the disk 115. A recording/reproduction head 114 is used to read/write data from/on the disk 115. In this embodiment, one file may be recorded on a continuous area or may include a plurality of data divisionally recorded on different areas.

In FIG. 11, when the application program 111 sends a reproduction start instruction to the file system driver 112, the file system driver 112 issues a reproduction instruction to the disk controller 113. At this time, the file system driver 112 detects if a discontinuous portion which requires seek is present within an area twice the moving image minimum recording size. Normally, as in the general CDA shown in FIG. 10, after data for the moving image minimum recording size Lv is read out, the seek process is made to read out data for the audio minimum recording size La. However, in this embodiment, after moving image data is read out up to such discontinuous portion, audio data is read out, and the seek process is directly made to moving image data after the discontinuous portion of the moving image data.

[CDA in After-recording Reproduction Mode]

Figure 12:
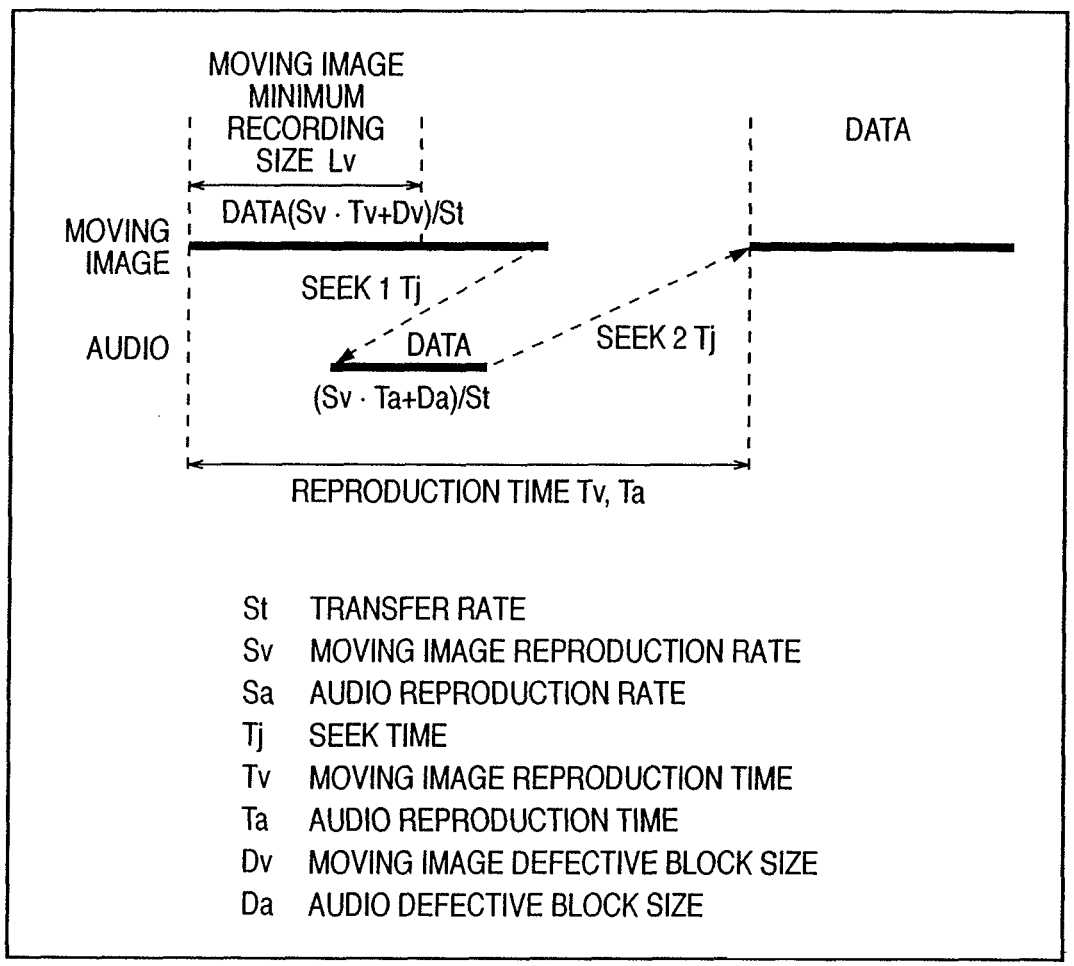
FIG. 12 is a view for explaining the relationship between the recorded data and reproduction time in a general after-recording reproduction mode by the information processing apparatus according to the third embodiment.

FIG. 12 is a view for explaining the relationship between the recorded data and reproduction time in a general after-recording reproduction mode by the information processing apparatus according to the third embodiment. The bold line portion in FIG. 12 indicates the read times of moving image data and audio data included in one each extents, and moving image data for a reproduction time Tv (sec) and audio data for a reproduction time Ta (sec) are included. Let Sv (bps) be the moving image reproduction rate, Sa (bps) be the audio reproduction rate, Dv (bits) be the defective block size in a moving image extent, Da (bits) be the defective block size in an audio extent, and St (bps) be the transfer rate from the disk. Then, the read time of data in the moving image extent from the disk is given by (Sv×Tv+Dv)/St (sec), and that of data in the audio extent from the disk is given by (Sa×Ta+Da)/St (sec).

Let Tj (sec) be the time (seek time) required for the head to move between extents. Then, in order to continuously make after-recording reproduction without any disruption, the data read process and head seek process must be completed twice within the reproduction times Tv and Ta (sec) of the moving image data and audio data included in one each extents. That is, the following inequalities need only be satisfied:

$$Tv \geq 2 \times Tj + \frac{Sv \times Tv + Dv}{St} + \frac{Sa \times Ta + Da}{St} \quad (10)$$

$$Ta \geq 2 \times Tj + \frac{Sa \times Ta + Da}{St} + \frac{Sv \times Tv + Dv}{St}$$

From the above inequalities, we have:

$$\left(1 - \frac{Sv}{St} - \frac{Sa}{St}\right)Tv \geq 2 \times Tj + \frac{Dv}{St} + \frac{Da}{St} \quad (11)$$

$$\left(1 - \frac{Sa}{St} - \frac{Sv}{St}\right)Ta \geq 2 \times Tj + \frac{Da}{St} + \frac{Dv}{St}$$

(minimum values of Tv and Ta are equal to each other), and the CDA is defined by:

$$Tv \geq \frac{2 \times Tj + Dv/St + Da/St}{1 - Sv/St - Sa/St} \quad (12)$$

$$Ta \geq \frac{2 \times Tj + Da/St + Dv/St}{1 - Sv/St - Sa/St}$$

$$Lv \geq Sv \times Tv + Dv$$

$$La \geq Sa \times Ta + Da$$

where Tv and Ta are the minimum recording times (sec) of moving image data and audio data that guarantee continuous reproduction, respectively. Also, Lv and La are the minimum recording sizes (bits) of moving image data and audio data that guarantee continuous reproduction, respectively. As can be seen from the above inequalities, the minimum values of Tv and Ta are equal to each other. As is understood from comparison between inequalities (9) associated with the general CDA, and inequalities (12) associated with the CDA in this embodiment, since the number of times of seek is reduced from 3 to 2, the influence of the seek time is reduced by ⅔ times. In this embodiment as well, "sec" and "bits" are used as units of time and size, but the present invention is not limited to such specific units.

[Actual Data Recording Size]

In an actual apparatus, the maximum seek time Tj and transfer rate St are constant. Hence, upon actually recording data, the CDA size is determined based on the reproduction rates of moving image data and audio data, and the defective block size.

FIG. 13 shows an example of CDA calculations in a general after-recording reproduction mode. FIG. 14 shows an example of CDA calculations in the after-recording reproduction mode according to this embodiment. As can be seen from FIGS. 13 and 14, the CDA calculation example in the after-recording reproduction mode according to this embodiment assumes values smaller than those in the CDA calculation example in the general after-recording reproduction mode. Note that the audio reproduction rate is normally constant, and a change in audio reproduction rate is sufficiently smaller than that in moving image reproduction rate even if it takes place. Hence, the influence of the change in audio reproduction rate on a change in CDA can be ignored.

As described above, according to this embodiment, upon reading streams of moving image data and audio data recorded on the disk, when a stream discontinuous point that requires seek is present until data having a size smaller than that twice the minimum recording unit is present, the data size to be read onto the buffer RAM is increased to a size smaller than that twice the minimum recording unit in maximum. In a discontinuous portion, another stream is sought to read it out, and the original stream is then sought. Hence, an increase in minimum recording unit can be suppressed upon supporting the after-recording reproduction mode.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, all extent sizes of data to be divisionally recorded on the disk can be set to be equal to or larger than the minimum recording size, and continuous reproduction of divisionally recorded data can be guaranteed.

The present invention is not limited to the above embodiments and various changes and modification can be made within the spirit and scope of the present inventions. Therefore, to apprise the public of the scope of the present invention, the following claims are made.

What is claimed is:

1. An information processing method for reading out and reproducing data which is divisionally recorded on a plurality of recording areas on a recording medium, the method comprising:
   a control step of controlling a reading-out order of a plurality of partial data of the data, which are recorded on the plurality of recording areas, on the basis of a minimum recording unit specified in the recording medium,
   wherein the control step comprises:
   a first step of reading out first data from a first recording area;
   a determination step of determining whether a discontinuous portion of the first data is encountered within a predetermined multiple of the minimum recording unit from a start position of the first recording area;
   a second step of seeking from the first recording area to a second recording area where second data is recorded after the first step reads out the first data up to the discontinuous portion, if it is determined that the discontinuous portion of the first data is encountered within the predetermined multiple of the minimum recording unit from the start position of the first recording area;
   a third step of reading out the second data from the second recording area; and
   a fourth step of seeking, after the second data is read out, from the second recording area to a recording area that follows the discontinuous portion where a continuation of the first data is recorded.

2. The method according to claim 1, wherein the plurality of partial data include moving image data and audio data.

3. The method according to claim 1, wherein the predetermined multiple of the minimum recording unit is twice the minimum recording unit.

4. An information processing method for reading out and reproducing data which is divisionally recorded on a plurality of recording areas on a recording medium, comprising:
   a control step of controlling a reading-out order of a plurality of partial data of the data, which are recorded on the plurality of recording areas, on the basis of a minimum recording unit specified in the recording medium,
   wherein the minimum recording unit is defined by a moving image minimum recording time Tv, audio minimum recording time Ta, moving image minimum recording size Lv, and audio minimum recording size La in an after-recording reproduction mode using a moving image file and audio file,
   the moving image minimum recording time Tv, audio minimum recording time Ta, moving image minimum recording size Lv, and audio minimum recording size La are respectively given by:

$Tv=(2\times Tj+Dv/St+Da/St)/(1-Sv/St-Sa/St)$ $Ta=(2\times Tj+Da/St+Dv/St)/(1-Sv/St-Sa/St)$ $Lv=Sv\times Tv+Dv$ $La=Sa\times Ta+Da$ where Tj is a head seek time, St is a transfer rate upon reading out data from a disk, Sv is a moving image reproduction rate, Sa is an audio reproduction rate, Dv is a defective block size included in a moving image minimum recording unit, and Da is a defective block size included in an audio minimum recording unit.

5. An information processing method by reading out and reproducing a plurality of data which are divisionally recorded on a recording medium, comprising:
   a control step of controlling a reproduction order of the plurality of data on the basis of a minimum recording unit specified in the recording medium,
   wherein the control step comprises:
   a first step of reading out first data from a first recording area;
   a second step of seeking, under the condition that a discontinuous portion of the first data is reached before less than a predetermined multiple of the minimum recording unit of data is read out from the first recording area, to a second recording area after reading out data until the discontinuous portion is reached;
   a third step of reading out second data from the second recording area; and
   a fourth step of seeking, after the second data is read out, from the second recording area to a recording area where data next to the discontinuous portion of the first data is recorded,
   wherein when reading out moving image data and audio data as the plurality of data and executing after-recording reproduction, if a discontinuous portion of moving image data is reached before less than a predetermined multiple of the minimum recording unit of moving image data is read out, the method seeks to a recording area of audio data and reads out the audio data after reading out the moving image data without seeking to another recording area until the discontinuous portion is reached, and then, seeks to a recording area where moving image data next to the discontinuous portion is recorded.

6. The method according to claim 5, wherein when reading out the moving image data and the audio data recorded on the recording medium, if there exists a discontinuous portion which requires seeking before less than a predetermined multiple of the minimum recording unit of moving image data is read out, the method increases data size to be read in buffer memory to the size corresponding to said less than a predetermined multiple of the minimum recording unit.

7. The method according to claim 5, wherein the minimum recording unit is defined by a moving image minimum recording time Tv, audio minimum recording time Ta, moving image minimum recording size Lv, and audio minimum recording size La in an after recording reproduction mode using the moving image data and the audio data, and
   the moving image minimum recording time Tv, audio minimum recording time Ta, moving image minimum recording size Lv, and audio minimum recording size La are respectively given by:

$Tv=(2\times Tj+Dv/St+Da/St)/(1-Sv/St-Sa/St)$ $Ta=(2\times Tj+Da/St+Dv/St)/(1-Sv/St-Sa/St)$ $Lv=Sv\times Tv+Dv$ $La=Sa\times Ta+Da$ where Tj is a head seek time, St is a transfer rate upon reading out data from a disk-shaped recording medium, Sv is a moving image reproduction rate, Sa is an audio reproduction rate, Dv is a defective block size included in a moving image minimum recording unit, and Da is a defective block size included in an audio minimum recording unit.

8. The method according to claim 5, wherein the recording medium is a data rewritable optical disk.

9. An information processing apparatus for reading out and reproducing a plurality of data which are divisionally recorded on a recording medium, comprising:

a control unit which controls a reproduction order of the plurality of data on the basis of a minimum recording unit specified in the recording medium, wherein the control unit:

seeks, under the condition that a discontinuous portion of first data is reached before less than a predetermined multiple of the minimum recording unit of data is read out from a first recording area, to a second recording area after reading out data until the discontinuous portion is reached;

reads out second data from the second recording area; and seeks, after the second data is read out, from the second recording area to a recording area where data next to the discontinuous portion of the first data is recorded, wherein when reading out moving image data and audio data as the plurality of data and executing after-recording reproduction, if a discontinuous portion of moving image data is reached before less than a predetermined multiple of the minimum recording unit of moving image data is read out, the control unit seeks to a recording area of audio data and reads out the audio data after reading out the moving image data without seeking to another recording area until the discontinuous portion is reached, and then, seeks to a recording area where moving image data next to the discontinuous portion is recorded.

* * * * *